March 23, 1926.
M. L. CADIEUX
NONSKID TRACTION SHOE
Filed Jan. 14, 1925
1,578,071
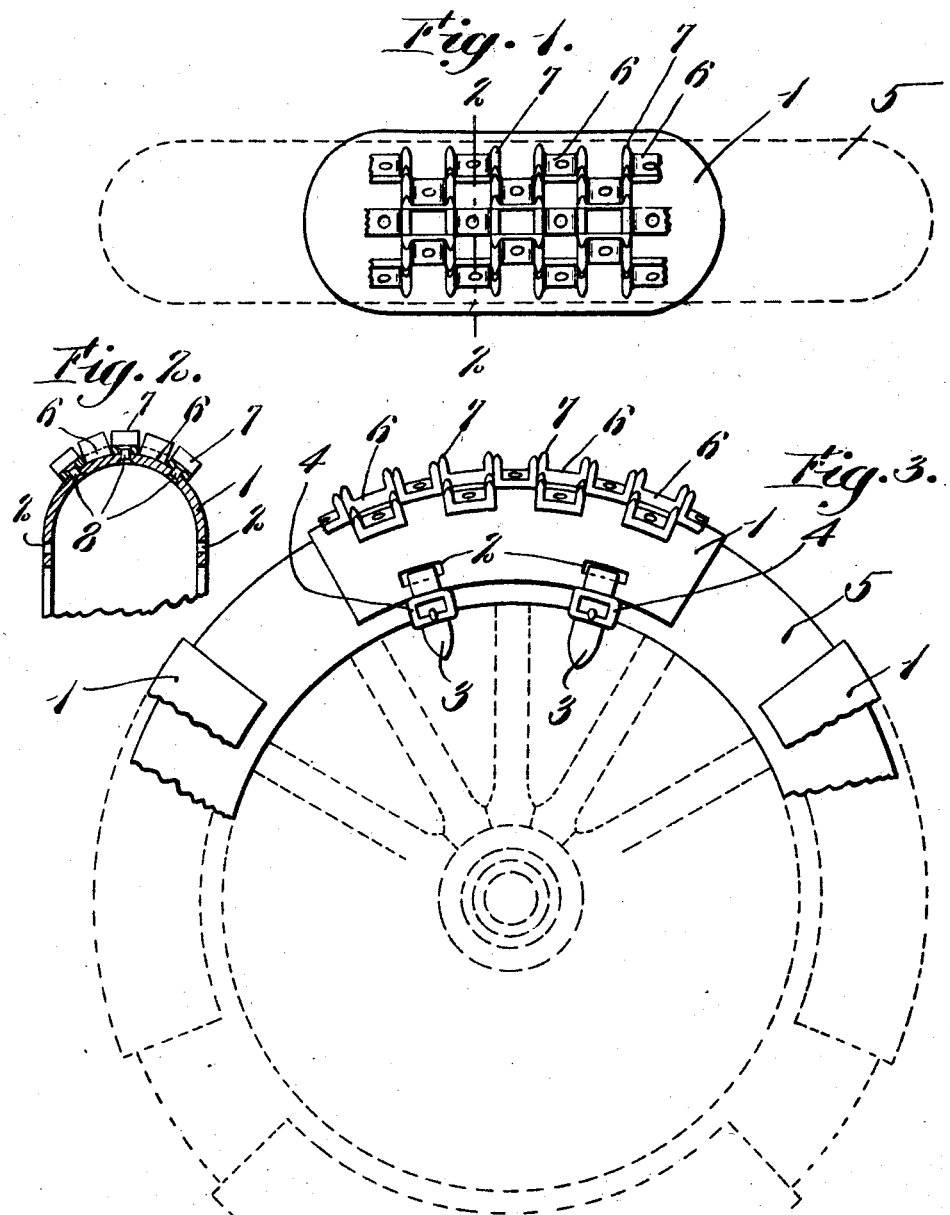

Patented Mar. 23, 1926.

1,578,071

UNITED STATES PATENT OFFICE.

MARIE L. CADIEUX, OF CHARLESTOWN, MASSACHUSETTS.

NONSKID TRACTION SHOE.

Application filed January 14, 1925. Serial No. 2,432.

*To all whom it may concern:*

Be it known that I, MARIE L. CADIEUX, a citizen of the United States, and resident of Charlestown, in the county of Suffolk and State of Massachusetts, have invented an Improvement in Nonskid Traction Shoes, of which the following description, in connection with the accompanying drawings, is a specification, like reference characters on the drawings representing like parts.

My present invention is a novel and improved attachable and detachable device or shoe for use in connection with vehicle wheels, particularly resilient tired wheels, and the object of the invention is to provide a non-skidding device, as well as an apparatus to increase and insure traction of the wheel.

Important features of my present invention consist in the provision of means, and preferably a plurality of means, which will be effective to prevent slipping, and to increase traction in all directions, substantially around the circumference of the wheel, and will enable the shoe to be as effective in forward driving as in backing, and as well, also, in preventing side or lateral skidding.

A further important advantage and feature consists in the fact that I preferably employ a plurality of non-skid and traction devices, which devices are readily removable and renewable, upon being worn to the limit of their efficiency. Such renewing can be quickly and easily effected, without damage to the shoe itself, or to the other unworn devices.

In carrying out my present invention, I prefer to utilize a metallic member for the shoe, which is adapted to have the non-skidding and traction devices removably attached thereto, which member is furthermore shaped to rest across the tread surface of the tire, either a pneumatic or other resilient tire on a wheel, and with the sides or end portions of this metallic shoe member so formed and positioned as to permit the normal resiliency of the vehicle tire to be effective.

A further feature of my present invention, is that I may provide a plurality of my novel non-skid traction shoes to a vehicle tire, in such a way that they are non-contacting, and thus the normal resilient action of the vehicle tire to which the shoes are applied, is not impaired.

Further advantages, novel combinations of parts, and details of construction, will be hereinafter more fully pointed out and claimed.

Referring to the drawings illustrating a preferred embodiment of my invention,

Fig. 1 is a top plan view of my novel non-skid traction shoe.

Fig. 2 is a fragmentary cross sectional view on the line 2—2 of Fig. 1, and

Fig. 3 is a side elevation, partly in dotted lines, of a vehicle wheel with my novel shoe attached thereto.

As shown in the drawings, my present novel non-skid traction shoe comprises a metallic member 1, provided with apertures (here shown as two) 2, 2, through which apertures or slots, are fitted retaining belts 3, 3 with buckles 4, 4, or other fastening means, to secure the member 1 to the vehicle tire 5. The strips 3 may be of leather, heavy fabric, or other suitable material. To the member 1, and extending across the entire tread surface thereof, I apply a plurality of renewable and removable non-skid traction devices 6, 6, each of these devices comprising a body portion, and outwardly extending road gripping lugs, or projections 7, 7. The devices 6, are secured to the member 1 by means of rivets or the like 8, 8, these rivets extending through cooperating apertures in the devices 6 and member 1. The members 6 are also preferably metallic. As shown in Fig. 1, these non-skid devices 6 are applied to the member 1 in staggered relation, and are so positioned that they will give increased traction, forwardly and backwardly, and will also aid in preventing lateral or sidewise skidding.

It will be appreciated that I may apply any desired number of these members 1 to a vehicle wheel. It is the work of a very few minutes to remove and replace these non-skid devices 6, when the same have been worn to their limit of efficiency, and by thus providing a main member 1, to which these individual non-skid members may be applied, I have devised a non-skid traction shoe which is extremely economical to manufacture, efficient in service, and simple to repair.

I believe that my invention of a non-skid traction shoe comprising a tire-fitting metallic member, to which are applied a plurality of removable and renewable non-skid units, in staggered relation for the greatest efficiency, is new, and the same is claimed herein.

It will be appreciated that while I have necessarily described my invention somewhat in detail, that I may vary the size, shape, or arrangement of parts within reasonably wide limits, without departing from the spirit of the invention.

My invention is further described and defined in the form of a claim as follows:

A metallic non-skid and traction shoe for automobile tires, constructed and arranged to be positioned over a portion only of said tire, and having thereon a plurality of removable and renewable rectangular metallic plates, the ends of these plates being upturned to form ground gripping calks, said plates being arranged in staggered relation with the upturned calks on alternate plates substantially abutting to form a continuous line of contact with the ground, and adjustable means to connect said shoe to a vehicle tire.

In testimony whereof, I have signed my name to this specification.

MARIE L. CADIEUX.